(12) United States Patent
Armstrong

(10) Patent No.: US 12,136,754 B2
(45) Date of Patent: Nov. 5, 2024

(54) ELECTROLYTE MATERIALS FOR SOLID OXIDE ELECTROLYZER CELLS

(71) Applicant: BLOOM ENERGY CORPORATION, San Jose, CA (US)

(72) Inventor: Tad Armstrong, Burlingame, CA (US)

(73) Assignee: BLOOM ENERGY CORPORATION, San Jose, CA (US)

(*) Notice: Subject to any disclaimer, the term of this patent is extended or adjusted under 35 U.S.C. 154(b) by 156 days.

(21) Appl. No.: 17/318,527

(22) Filed: May 12, 2021

(65) Prior Publication Data

US 2021/0359324 A1 Nov. 18, 2021

Related U.S. Application Data

(60) Provisional application No. 63/146,081, filed on Feb. 5, 2021, provisional application No. 63/024,702, filed on May 14, 2020.

(51) Int. Cl.
*H01M 8/1253* (2016.01)
*H01M 8/126* (2016.01)

(52) U.S. Cl.
CPC ......... *H01M 8/1253* (2013.01); *H01M 8/126* (2013.01)

(58) Field of Classification Search
CPC .. H01M 8/1253; H01M 8/126; H01M 8/1231; Y02E 60/36; Y02E 60/50; Y02P 70/50
See application file for complete search history.

(56) References Cited

U.S. PATENT DOCUMENTS

| | | | |
|---|---|---|---|
| 6,821,663 B2 | 11/2004 | McElroy et al. | |
| 6,854,688 B2 | 2/2005 | McElroy et al. | |
| 6,924,053 B2 | 8/2005 | McElroy et al. | |
| 7,045,238 B2 | 5/2006 | Gottmann et al. | |
| 7,150,927 B2 | 12/2006 | Hickey et al. | |
| 7,364,810 B2 | 4/2008 | Sridhar et al. | |
| 7,575,822 B2 | 8/2009 | Mitlitsky et al. | |
| 7,951,509 B2 | 5/2011 | Cassidy et al. | |
| 8,293,412 B2 | 10/2012 | McElroy | |
| 8,580,456 B2* | 11/2013 | Armstrong | H01M 8/1246 429/496 |
| 10,249,883 B2 | 4/2019 | Leming et al. | |
| 2006/0166070 A1 | 7/2006 | Hickey et al. | |

(Continued)

FOREIGN PATENT DOCUMENTS

JP 5-294629 11/1993
JP 05-294629 A 11/1993

(Continued)

OTHER PUBLICATIONS

Modified translation JP2015191810A, Hata (Year: 2015).*

(Continued)

*Primary Examiner* — Jonathan G Jelsma
*Assistant Examiner* — Niara Trant
(74) *Attorney, Agent, or Firm* — THE MARBURY LAW GROUP PLLC

(57) ABSTRACT

A solid oxide electrolyzer electrolyte composition includes a scandia and ceria stabilized zirconia, containing 5 to 12 mol % scandia, 1 to 7 mol % ceria, and 80 to 94 mol % zirconia, or a yttria and ceria stabilized zirconia containing 3 to 10 mol % yttria, 1 to 6 mol % ceria, and 84 to 96 mol % zirconia.

16 Claims, 2 Drawing Sheets

(56) References Cited

U.S. PATENT DOCUMENTS

| | | |
|---|---|---|
| 2006/0216575 A1 | 9/2006 | Cassidy |
| 2009/0130505 A1 | 5/2009 | McElroy |
| 2011/0183233 A1 | 7/2011 | Armstrong et al. |
| 2014/0367249 A1 | 12/2014 | Wu et al. |
| 2016/0133947 A1 | 5/2016 | Leming et al. |
| 2019/0330751 A1 | 10/2019 | Blennow et al. |
| 2021/0359324 A1 | 11/2021 | Armstrong |

FOREIGN PATENT DOCUMENTS

| | | | |
|---|---|---|---|
| JP | 5061408 B2 | * | 10/2012 |
| JP | 2015501515 A | * | 1/2015 |
| JP | 2015191810 A | * | 11/2015 |
| WO | WO2021231523 A2 | | 11/2021 |

OTHER PUBLICATIONS

Modified trabslation JP2002329511A (JP-5061408-B2), Fukuzawa (Year: 2012).*

JP2015501515A English translation Jabbar et al. (Year: 2015).*

Third Party Observation and additional comments submitted with observation dated Aug. 15, 2022 for corresponding PCT Application No. PCT/US2021/031908.

U.S. Appl. No. 17/120,426, filed Dec. 14, 2020, Bloom Energy Corporation.

Laguna-Bercero, M. A. et al,, "Micro-spectroscopic study of the degradation of scandia and ceria stabilized zirconia electrolytes in solid oxide electrolysis cells", International journal of hydrogen energy, 2011, vol. 36, No. 20, pp. 13051-13058.

Naito, H. et al., "Oxygen transport properties in $ZrO_2$—$CeO_2$—$Y_2O_3$ by SIMS analysis", Solid state ionics, 2000, vol. 135, No. 1/4, pp. 669-673.

Laguna-Bercero, M. A. et al, "Performance of solid oxide electrolysis cells based on scandia stabilised zirconia", Journal of power sources, 2009, vol. 192, No. 1, pp. 126-131.

Zou, X. et al., "$CeO_2$—$Y_2O_3$—$ZrO_2$ membrane with enhanced molten salt corrosion resistance for solid oxide membrane (SOM) electrolysis process", Metallurgical and materials transactions. B, Process metallurgy and materials processing science, 2017, vol. 48, No. 1, pp. 678-691.

International Search Report and Written Opinion mailed Dec. 31, 2021 for corresponding Application No. PCT/US2021/031908.

Canadian Patent Office Communication and Search Report for Canadian Patent Application No. 3,178,422, mailed Apr. 4, 2024, 4 pages.

European Patent Office Communication, Extended European Search Report for European Patent Application No. 21803360.3, mailed May 27, 2024, 15 pages.

Oksuzomer, F. et al., "Preparation of Yttria-Stabilized Zirconia by the Reverse Microemulsion Method and the Effect of Sc and Ce Doping on Microstructure and Ionic Conductivity for Solid Oxide Fuel Cell applications," In. J. Appl. Ceram. Technol., vol. 8, No. 1, pp. 42-48, (2011); DOI:10.1111/j.1744-7402.2009.02432.x.

* cited by examiner

ELECTROLYTE MATERIALS FOR SOLID OXIDE ELECTROLYZER CELLS

FIELD

The present invention is directed to electrolyte materials for use in solid oxide electrolyzer cells (SOEC) that mitigate cathode delamination.

BACKGROUND

Solid oxide fuel cells (SOFC) can be operated as electrolyzer cells in order to produce hydrogen and oxygen from water. Such cells are referred to as solid oxide electrolyzer cells (SOEC). In SOFC mode, oxygen ions are transported from the cathode side (air) to the anode side (fuel) and the driving force is the chemical gradient of partial pressure of oxygen across the electrolyte. In SOEC mode, a positive potential is applied to the air side of the cell and the oxygen ions are transported from the fuel side to the air side. Since the cathode and anode are reversed between SOFC and SOEC (i.e. SOFC cathode is SOEC anode, and SOFC anode is SOEC cathode), the SOFC cathode (SOEC anode) is referred to as the air electrode, and the SOFC anode (SOEC cathode) is referred to as the fuel electrode. A SOEC includes a ceramic (e.g., solid oxide) electrolyte, an air electrode, and a fuel electrode. During SOEC mode, water in the fuel stream is reduced ($H_2O + 2e \rightarrow O^{-2} + H_2$) to form $H_2$ gas and $O^{-2}$ ions, $O^{-2}$ ions are transported through the solid electrolyte, and then oxidized on the air side ($2O^{-2} \rightarrow O_2$) to produce molecular oxygen. Since the open circuit voltage for a SOFC operating with air and wet fuel (hydrogen, reformed natural gas) is on the order of 0.9 to 1V (depending on water content), the positive voltage applied to the air side electrode in SOEC mode raises the cell voltage up to typical operating voltages of 1.1 to 1.3V. In constant current mode, the cell voltages will increase with time if there is degradation of the cell which can arise from both ohmic sources and electrode polarization.

One of the major hurdles encountered with state-of-the-art SOEC is the delamination of the air electrode at high current densities. The degree of delamination increases with the current density and the flux of oxide ion transport.

SUMMARY

In one embodiment, a solid oxide electrolyzer cell electrolyte composition includes a scandia and ceria stabilized zirconia, comprising 5 to 12 mol % scandia, 1 to 7 mol % ceria, and 80 to 94 mol % zirconia. In one embodiment, the electrolyte composition comprises 5 to 10 mol % scandia, 1 to 5 mol % ceria, and 84 to 94 mol % zirconia. In another embodiment, the electrolyte composition comprises 5 to 10 mol % scandia, 2 to 5 mol % ceria, and 84 to 94 mol % zirconia. In one embodiment, the electrolyte composition further comprises 0.5 to 3 mol % ytterbia.

In another embodiment, a solid oxide electrolyzer cell electrolyte composition includes a yttria and ceria stabilized zirconia, comprising 3 to 10 mol % yttria, 1 to 6 mol % ceria, and 84 to 95 mol % zirconia.

A solid oxide electrolyzer cell includes the above electrolyte composition(s), an air electrode, and a fuel electrode.

FIGURES

DETAILED DESCRIPTION

Figure 1A:
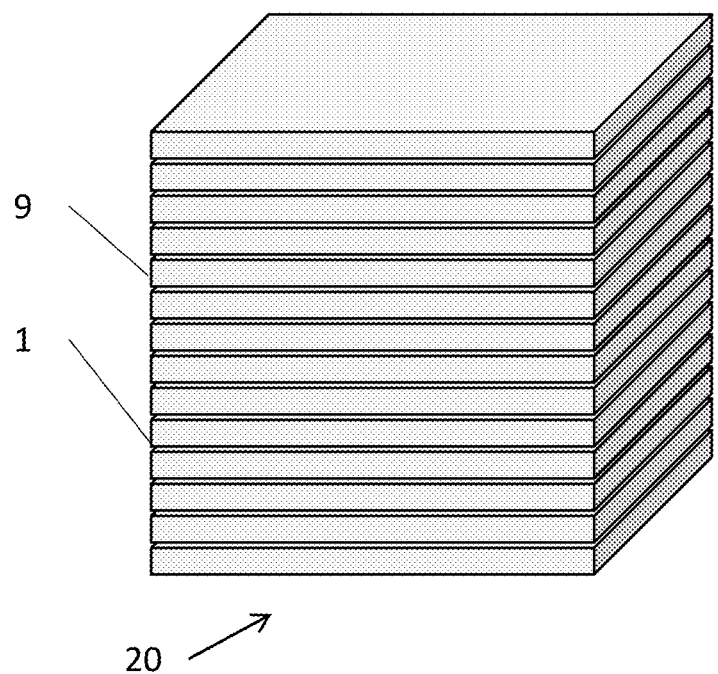
FIG. 1A is a perspective view of a solid oxide electrolyzer cell (SOEC) stack.
Figure 1B:
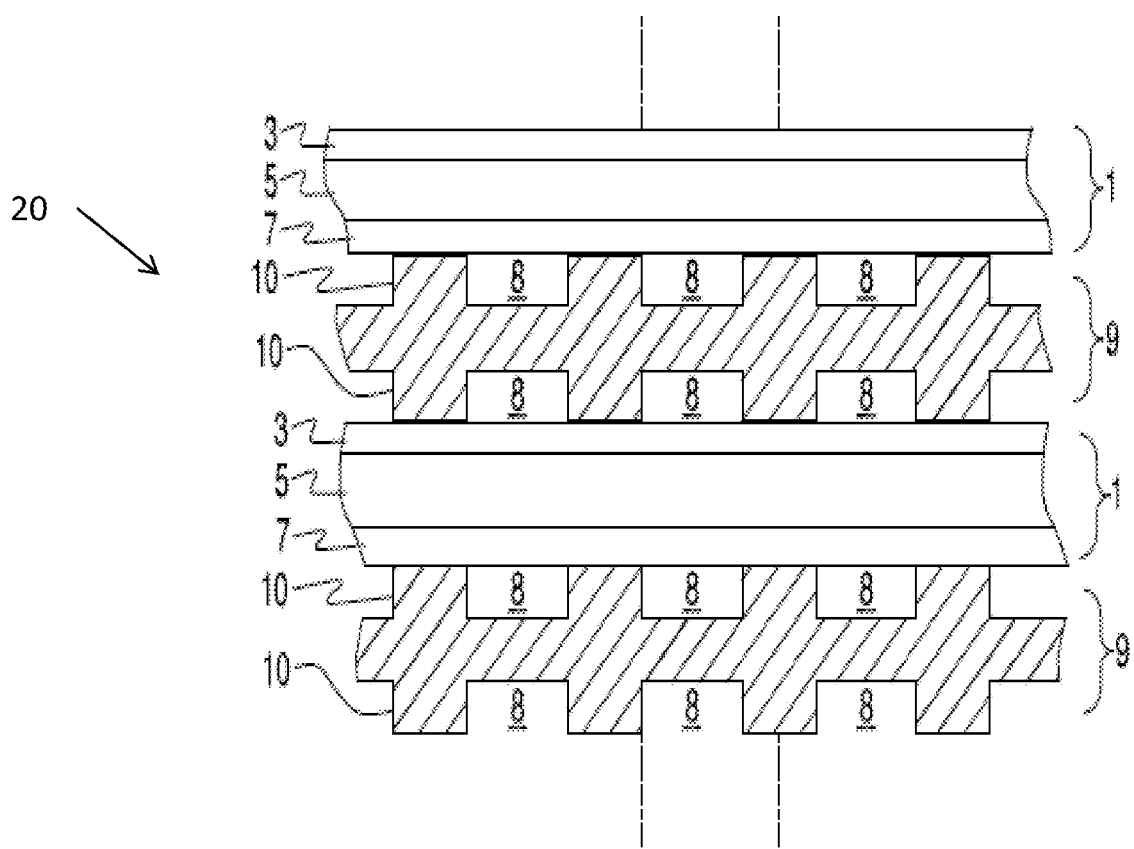
FIG. 1B is a side cross-sectional view of a portion of the stack of FIG. 1A.

FIG. 1A is a perspective view of a solid oxide electrolyzer cell (SOEC) stack 20, and FIG. 1B is a side cross-sectional view of a portion of the stack 20 of FIG. 1A. Referring to FIGS. 1A and 1B, the stack 20 includes multiple electrolyzer cells 1 that are separated by interconnects 9, which may also be referred to as gas flow separator plates or bipolar plates. Each electrolyzer cell 1 includes an air electrode 3, a solid oxide electrolyte 5, and a fuel electrode 7. The stack 20 also includes internal fuel riser channels 22.

Each interconnect 9 electrically connects adjacent electrolyzer cells 1 in the stack 20. In particular, an interconnect 9 may electrically connect the fuel electrode 7 of one electrolyzer cell 1 to the air electrode 3 of an adjacent electrolyzer cell 1. FIG. 1B shows that the lower electrolyzer cell 1 is located between two interconnects 9.

Each interconnect 9 includes ribs 10 that at least partially define fuel channels 8 and air channels 8 on opposite sides of the interconnect The interconnect 9 may operate as a gas-fuel separator that separates a fuel, such as a water vapor, flowing to the fuel electrode 7 of one cell 1 in the stack 20 from oxidant, such as air, flowing to the air electrode 3 of an adjacent cell 1 in the stack 20. At either end of the stack 20, there may be an air end plate or fuel end plate (not shown) for providing air or fuel, respectively, to the end electrode. The end plates are electrically connected to a power source (e.g., voltage or current source) which provides electrical power to the stack 20 for the electrolysis reaction in which water provided to the fuel electrode 7 is separated into hydrogen on the fuel side and oxygen which are transported from the fuel electrode 7 to the air electrode 3 through the electrolyte 5.

The air electrode 3 may comprise a mixture of an electrically conductive material and an electrically insulating ceramic material. The electrically conductive material may comprise a perovskite electrically conductive material, such as lanthanum strontium manganate, or a metal, such as platinum. The electrically insulating ceramic material may comprise an ionically conductive stabilized or partially stabilized zirconia ($ZrO_2$) material, such as a rare earth stabilized (e.g., doped) zirconia, such as scandia ($Sc_2O_3$) stabilized zirconia (SSZ), yttria ($Y_2O_3$) stabilized zirconia (YSZ), and/or ytterbia ($Yb_2O_3$) stabilized zirconia (YbSZ). The fuel electrode 7 may comprise a cermet material, such as a nickel and a stabilized zirconia and/or doped ceria cermet.

Without wishing to be bound by a particular theory, the delamination of the air electrode 3 may be caused by the precipitation of oxygen at the electrolyte/air electrode interface which can lead to high pressures resulting in air electrode delamination.

Embodiments of the invention provide electrolyte 5 materials that help mitigate the air electrode delamination and allow SOEC to operate at higher current densities. It has been found that increasing the amount of ceria in a Scandia-Ceria doped Zirconia fluorite material helps mitigate air electrode delamination. For example, SOEC's were tested with two different electrolyte materials with one having approximately twice the amount of ceria as the other. The electrolytes were A) 88 mol % $ZrO_2$-10 mol % $Sc_2O_3$-2 mol % $CeO_2$, which can written as $Zr_{0.8}Sc_{0.182}Ce_{0.018}O_{2-x}$, and B) 88 mol % $ZrO_2$-10 mol % $Sc_2O_3$-1 mol % $CeO_2$-1 mol % $Yb_2O_3$, which can be written as $Zr_{0.793}Sc_{0.180}Ce_{0.009}Yb_{0.018}O_{2-x}$. The SOEC stack consisted of cells numbered 1-5 with electrolyte A and cells numbered 6-10 with electrolyte B, and was operated for extended periods of time at the different currents, 1 A, 2 A, 4 A, 10 A, 15 A, and 20 A. At low currents (1-4 A), cells with both electrolyte compositions behaved well and similarly, as shown in the FIG. 2.

However, at higher currents (10A and above), the cells with electrolyte composition B (lower ceria content) exhibited a higher voltage increase during operation, indicating higher resistance and cell over potential. The two type of cells have the same air and fuel electrodes and the only difference is the electrolyte composition. Without wishing to be bound by a particular theory, the inventor believes that the higher ceria content in the electrolyte increases the electronic conductivity in the electrolyte, which mitigates the precipitation of oxygen at the electrolyte/cathode interface.

Based on these results, the following compositions of doped zirconia are provided for SOEC electrolyte 5 materials.

10 mol % scandia doped zirconia with 1 to 5 mol % $CeO_2$ doping as shown below:
    89 mol % $ZrO_2$-10 mol % $Sc_2O_3$-1 mol % $CeO_2$;
    88 mol % $ZrO_2$-10 mol % $Sc_2O_3$-2 mol % $CeO_2$;
    87 mol % $ZrO_2$-10 mol % $Sc_2O_3$-3 mol % $CeO_2$;
    86 mol % $ZrO_2$-10 mol % $Sc_2O_3$-4 mol % $CeO_2$;
    85 mol % $ZrO_2$-10 mol % $Sc_2O_3$-5 mol % $CeO_2$.

9 mol % scandia doped zirconia with 1-5 mol % $CeO_2$ doping, as shown below:
    90 mol % $ZrO_2$-9 mol % $Sc_2O_3$-1 mol % $CeO_2$ to 86 mol % $ZrO_2$-9 mol % $Sc_2O_3$-5 mol % $CeO_2$;
    8 mol % Scandia doped zirconia with 1-5 mol % $CeO_2$ doping;
    7 mol % Scandia doped zirconia with 1-5 mol % $CeO_2$ doping;
    6 mol % Scandia doped zirconia with 1-5 mol % $CeO_2$ doping;
    5 mol % Scandia doped zirconia with 1-5 mol % $CeO_2$ doping.

Ytterbia may also be added to the scandia and ceria stabilized zirconia at 0.5 to 3 mol %, such as 0.75 to 1.5 mol %, as shown below:
    10 mol % Scandia-1 mol % $Yb_2O_3$ doped zirconia with 1-5 mol % $CeO_2$ doping;
    88 mol $Zr_2O_2$-10 mol % $Sc_2O_3$-1 mol % $Yb_2O_3$-1 mol % $CeO_2$;
    87 mol $Zr_2O_2$-10 mol % $Sc_2O_3$-1 mol % $Yb_2O_3$-2 mol % $CeO_2$;
    86 mol $Zr_2O_2$-10 mol % $Sc_2O_3$-1 mol % $Yb_2O_3$-3 mol % $CeO_2$;
    85 mol $Zr_2O_2$-10 mol % $Sc_2O_3$-1 mol % $Yb_2O_3$-4 mol % $CeO_2$;
    84 mol $Zr_2O_2$-10 mol % $Sc_2O_3$-1 mol % $Yb_2O_3$-5 mol % $CeO_2$.

As above: 5-9 mol % Scandia doped zirconia-1 mol % $Yb_2O_3$-(1-5 mol % $CeO_2$).

Figure 2:
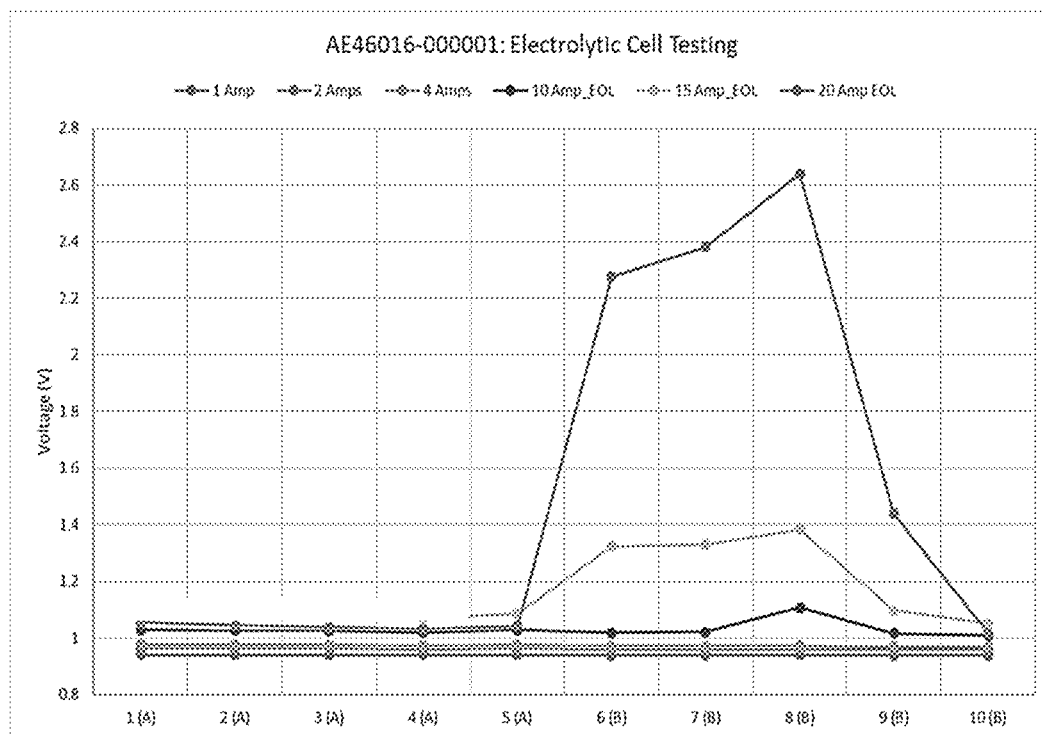
FIG. 2 is a plot of voltage at different current for different electrolyzer cells. The figure shows cell voltage of two electrolyte compositions (A and B) operated for extended periods of time at various currents.

Thus, compositions with at least 2 mol % ceria, such as 2 to 7 mol %, including 2 to 5 mol % ceria, are preferred based on FIG. 2.

In another embodiment, the electrolyte compositions may comprise yttria and ceria stabilized zirconia. The compositions may comprise 3 to 10 mol % yttria, 1 to 6 mol % ceria, and 84 to 96 mol % zirconia.

In one embodiment, the electrolyte composition comprises 3 mol % yttria, 1 to 5 mol % ceria, (such as 1, 2, 3, 4 or 5 mol % ceria), and 92 to 96 mol % zirconia. In another embodiment, the electrolyte composition comprises 8 mol % yttria, 2 to 6 mol % ceria, (such as 2, 3, 4, 5 or 6 mol % ceria,) and 86 to 90 mol % zirconia. In another embodiment, the electrolyte composition comprises 10 mol % yttria, 1 to 4 mol % ceria, (such as 1, 2, 3 or 4 mol % ceria), and 86 to 89 mol % zirconia.

The yttria and ceria stabilized zirconia may be formed by mixing yttria stabilized zirconia powder and ceria powder followed by sintering the powder blends into the electrolyte composition. Alternatively, the yttria and ceria stabilized zirconia may be formed by mixing yttria powder, zirconia powder and ceria powder followed by sintering the synthesized powders into the electrolyte composition.

8YSZ (8 mol % yttria stabilized zirconia) and $CeO_2$ powder blends may be formed as follows: mix (100-x) mol % 8YSZ powder with x mol % $CeO_2$ powder, where x ranges from 2 to 6, as shown in the Table 1 below.

TABLE 1

| |
| --- |
| 8YSZ + 2$CeO_2$ |
| 8YSZ + 3$CeO_2$ |
| 8YSZ + 4$CeO_2$ |
| 8YSZ + 5$CeO_2$ |
| 8YSZ + 6$CeO_2$ |

8YSZ and $CeO_2$ synthesized powders may be formed as follows: mix 8 mol % ($Y_2O_3$) with x mol % ($CeO_2$) and (92-x) mol % ($ZrO_2$) powders, where x ranges from 2 to 5, as shown in the Table 2 below.

TABLE 2

| |
| --- |
| 8YSZ + 2 $CeO_2$: synthesize 8 mol %($Y_2O_3$) + 2 mol %($CeO_2$) + 90 mol %($ZrO_2$) |
| 8YSZ + 3 $CeO_2$: synthesize 8 mol %($Y_2O_3$) + 3 mol %($CeO_2$) + 89 mol %($ZrO_2$) |
| 8YSZ + 4 $CeO_2$: synthesize 8 mol %($Y_2O_3$) + 4 mol %($CeO_2$) + 88 mol %($ZrO_2$) |
| 8YSZ + 5 $CeO_2$: synthesize 8 mol %($Y_2O_3$) + 5 mol %($CeO_2$) + 87 mol %($ZrO_2$) |

3YSZ and $CeO_2$ powder blends may be formed as follows: mix (100-x) mol % 3YSZ powder with x mol % $CeO_2$ powder, where x ranges from 1 to 5.

3YSZ and $CeO_2$ synthesized powders may be formed as follows: mix 3 mol % ($Y_2O_3$) with x mol % ($CeO_2$) and (97-x) mol % ($ZrO_2$) powders, where x ranges from 1 to 5.

10YSZ and $CeO_2$ powder blends may be formed as follows: mix (100-x) mol % 10YSZ powder with x mol % $CeO_2$ powder, where x ranges from 1 to 4.

10YSZ and $CeO_2$ synthesized powders may be formed as follows: mix 10 mol % ($Y_2O_3$) with x mol % ($CeO_2$) and (90-x) mol % ($ZrO_2$) powders, where x ranges from 1 to 4.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The invention claimed is:

1. A solid oxide electrolyzer electrolyte composition consisting essentially of a scandia and ceria stabilized zirconia, the composition consisting essentially of
   5 to 12 mol % scandia;
   2 to 7 mol % ceria; and
   81 to 93 mol % zirconia.

2. The electrolyte composition of claim 1, consisting essentially of:
   5 to 10 mol % scandia;
   2 to 5 mol % ceria; and
   85 to 93 mol % zirconia,
   wherein the composition excludes yttria and ytterbia.

3. A solid oxide electrolyzer cell (SOEC) stack comprising:
   two or more solid oxide electrolyzer cells, each solid oxide electrolyzer cell comprising:
      an air electrode;
      a fuel electrode; and
      an electrolyte having the composition of claim 1, and
   at least one interconnect having a first side and second side, wherein the first side of the interconnect is electrically connected an air electrode of a first solid oxide electrolyzer cell in the stack and the second side of the interconnect is electrically connected to the fuel electrode of a second solid oxide electrolyzer cell in the stack.

4. The solid oxide electrolyzer cell (SOEC) stack of claim 3, wherein the air electrode of each solid oxide electrolyzer cell comprises an electrically conductive material and an electrically insulating ceramic material.

5. The solid oxide electrolyzer cell (SOEC) stack of claim 4, wherein the electrically conductive material of the air electrode comprises lanthanum strontium manganate.

6. The solid oxide electrolyzer cell (SOEC) stack of claim 4, wherein the electrically insulating ceramic material of the air electrode comprises at least one of scandia stabilized zirconia, yttria stabilized zirconia, or ytterbia stabilized zirconia.

7. The solid oxide electrolyzer cell (SOEC) stack of claim 3, wherein the stack includes internal fuel riser channels.

8. The solid oxide electrolyzer cell (SOEC) stack of claim 3, wherein the at least one interconnect includes ribs that partially define air channels on the first side and includes ribs that partially define fuel channels on the second side.

9. The solid oxide electrolyzer cell (SOEC) stack of claim 3, wherein the stack is connected to a power source to provide electrical power to the stack.

10. A solid oxide electrolyzer cell (SOEC) stack comprising:
    two or more solid oxide electrolyzer cells comprising:
       an air electrode;
       a fuel electrode; and
       an electrolyte having the composition of claim 2, and
    at least one interconnect having a first side and second side, wherein the first side of the interconnect is electrically connected an air electrode of a first solid oxide electrolyzer cell in the stack and the second side of the interconnect is electrically connected to the fuel electrode of a second solid oxide electrolyzer cell in the stack.

11. The solid oxide electrolyzer cell (SOEC) stack of claim 10, wherein the air electrode of each solid oxide electrolyzer cell comprises an electrically conductive material and an electrically insulating ceramic material.

12. The solid oxide electrolyzer cell (SOEC) stack of claim 11, wherein the electrically conductive material of the air electrode comprises lanthanum strontium manganate.

13. The solid oxide electrolyzer cell (SOEC) stack of claim 11, wherein the electrically insulating ceramic material of the air electrode comprises at least one of scandia stabilized zirconia, yttria stabilized zirconia, or ytterbia stabilized zirconia.

14. The solid oxide electrolyzer cell (SOEC) stack of claim 10, wherein the stack includes internal fuel riser channels.

15. The solid oxide electrolyzer cell (SOEC) stack of claim 10, wherein the at least one interconnect includes ribs that partially define air channels on the first side and includes ribs that partially define fuel channels on the second side.

16. The solid oxide electrolyzer cell (SOEC) stack of claim 10, wherein the stack is connected to a power source to provide electrical power to the stack.

\* \* \* \* \*